(12) United States Patent
Sugiyama et al.

(10) Patent No.: US 12,510,885 B2
(45) Date of Patent: Dec. 30, 2025

(54) INFORMATION PROCESSING DEVICE, INFORMATION PROCESSING METHOD, AND PACKAGE HANDLING SYSTEM

(71) Applicant: Kabushiki Kaisha Toshiba, Kawasaki (JP)

(72) Inventors: Masaaki Sugiyama, Zushi Kanagawa (JP); Masamitsu Shibata, Sendai Miyagi (JP); Hirokazu Nakamata, Yokohama Kanagawa (JP); Atsushi Matsumura, Yokohama Kanagawa (JP); Yoshihide Otsuru, Kawasaki Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 336 days.

(21) Appl. No.: 18/173,728

(22) Filed: Feb. 23, 2023

(65) Prior Publication Data
US 2023/0305545 A1    Sep. 28, 2023

(30) Foreign Application Priority Data
Mar. 23, 2022  (JP) ................................. 2022-046627

(51) Int. Cl.
*G05B 19/418* (2006.01)
*G05B 13/04* (2006.01)
*G05B 19/042* (2006.01)

(52) U.S. Cl.
CPC ....... *G05B 19/41885* (2013.01); *G05B 13/04* (2013.01); *G05B 19/0421* (2013.01)

(58) Field of Classification Search
CPC .............. G05B 19/41885; G05B 13/04; G05B 19/0421; G05B 19/042
See application file for complete search history.

(56) References Cited

U.S. PATENT DOCUMENTS

| 2007/0168065 A1* | 7/2007 | Nixon ................... G06F 9/4488 715/965 |
| 2011/0046775 A1* | 2/2011 | Bailey ...................... B07C 3/02 700/224 |

(Continued)

FOREIGN PATENT DOCUMENTS

| JP | 6556796 B2 | 8/2019 |
| JP | 2021504809 A | 2/2021 |

OTHER PUBLICATIONS

Japanese Office Action dated Oct. 7, 2025 in corresponding Japanese Patent Application 2022-046627 with English Translation, 7 pages.

*Primary Examiner* — Chad G Erdman
(74) *Attorney, Agent, or Firm* — Kim & Stewart LLP

(57) ABSTRACT

An information processing device for controlling a package handling system includes a first interface connected to a first logistics equipment, a second interface connected to a second logistics equipment, and a processor. The processor acquires flow rate data output by sensors of the first logistics equipment via the first interface, changes a format of the acquired flow rate data to a common format, acquires equipment information regarding the second logistics equipment via the second interface, changes a format of the equipment information to the common format, and generates a display screen showing flow rates at different points of the first logistics equipment, the equipment information, and a congestion state of the system, update the display screen after performing a simulation of the system, and issue a control signal in the first or second format to apply a change in an operating characteristic of the first or second logistics equipment.

20 Claims, 6 Drawing Sheets

(56) References Cited

U.S. PATENT DOCUMENTS

2016/0094421 A1\* 3/2016 Bali ..................... H04L 41/022
                                                                                   709/223
2020/0279204 A1    9/2020 Zhu \* cited by examiner

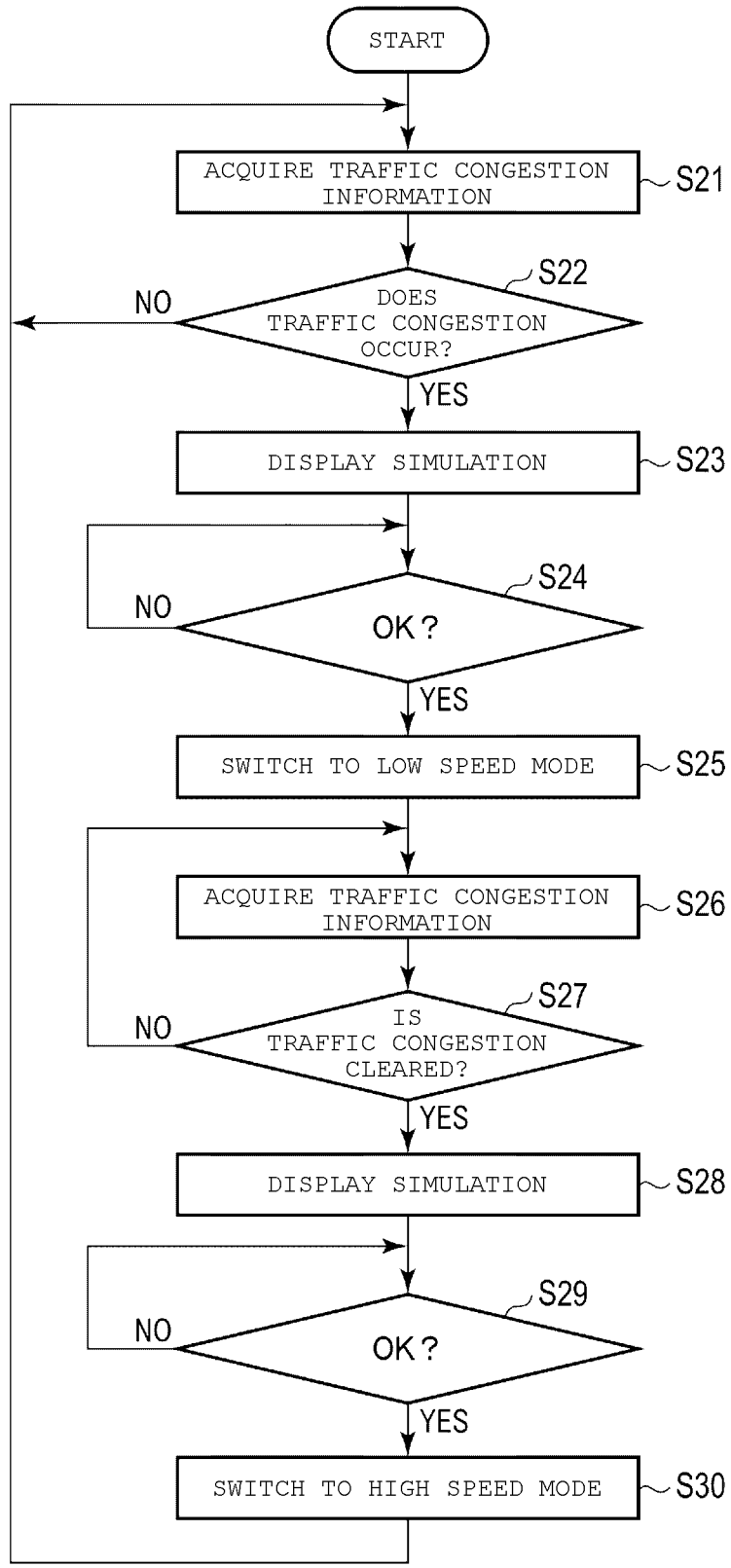

INFORMATION PROCESSING DEVICE, INFORMATION PROCESSING METHOD, AND PACKAGE HANDLING SYSTEM

CROSS-REFERENCE TO RELATED APPLICATION

This application is based upon and claims the benefit of priority from Japanese Patent Application No. 2022-046627, filed Mar. 23, 2022, the entire contents of which are incorporated herein by reference.

FIELD

Embodiments described herein relate generally to an information processing device, an information processing method, and a package handling system.

BACKGROUND

A system has been provided for taking out and sorting packages loaded on a pallet or the like. Such a system includes a logistics equipment such as a package unloader for unloading packages and a conveyor for sorting the packages.

The system acquires equipment information regarding an operation of the logistics equipment from each logistics equipment. The system displays the acquired equipment information and uses the acquired equipment information to control the logistics equipment.

The system has a problem that it cannot handle the equipment information from each logistics equipment in a unified manner when vendors of the logistics equipment are different.

DESCRIPTION OF THE DRAWINGS

FIG. 5 is a sequence diagram illustrating an operation example of the WES according to the embodiment.

DETAILED DESCRIPTION

Embodiments provide an information processing device, an information processing method, and a system capable of effectively processing equipment information from logistics equipment of different vendors.

In general, according to one embodiment, an information processing device for controlling a package handling system includes a first interface, a second interface, and a processor. The first interface is connected to a first logistics equipment supplied by a first vendor. The second interface is connected to a second logistics equipment supplied by a second vendor different from the first vendor. The processor is configured to acquire flow rate data output by sensors of the first logistics equipment via the first interface, change a format of the acquired flow rate data from a first format to a common format, acquire equipment information regarding the second logistics equipment via the second interface, change a format of the equipment information from a second format to the common format, generate a display screen for display on a monitor, using the flow rate data in the common format and the equipment information in the common format, the display screen showing flow rates at different points of the first logistics equipment, the equipment information, and a congestion state of the package handling system, update the display screen after performing a simulation of the package handling system with a change in at least one operating characteristic of one of the first logistics equipment and the second logistics equipment, the updated display screen showing flow rates at different points of the first logistics equipment, the equipment information, and a congestion state of the simulated package handling system, and issue a control signal that is in one of the first and second formats to apply the change in the at least one operating characteristic.

Next, embodiments will be described with reference to the drawings. A package handling system according to an embodiment unloads a package from a pallet using a package unloading device (which is one type of logistics equipment) such as a robot. The package handling system inputs the unloaded package onto a conveyor (which is another type of logistics equipment). The package handling system uses the conveyor to sort packages. The package handling system supplies the sorted package to a package shipping truck or the like. In addition, the package handling system may unload the package using a worker depending on the package or the like.

In addition, the package handling system also includes logistics equipment supplied by different vendors. Here, the package handling system includes a conveyor supplied by a predetermined vendor (e.g., vendor A) and a package unloader supplied by another vendor (e.g., vendor B).

Figure 1:
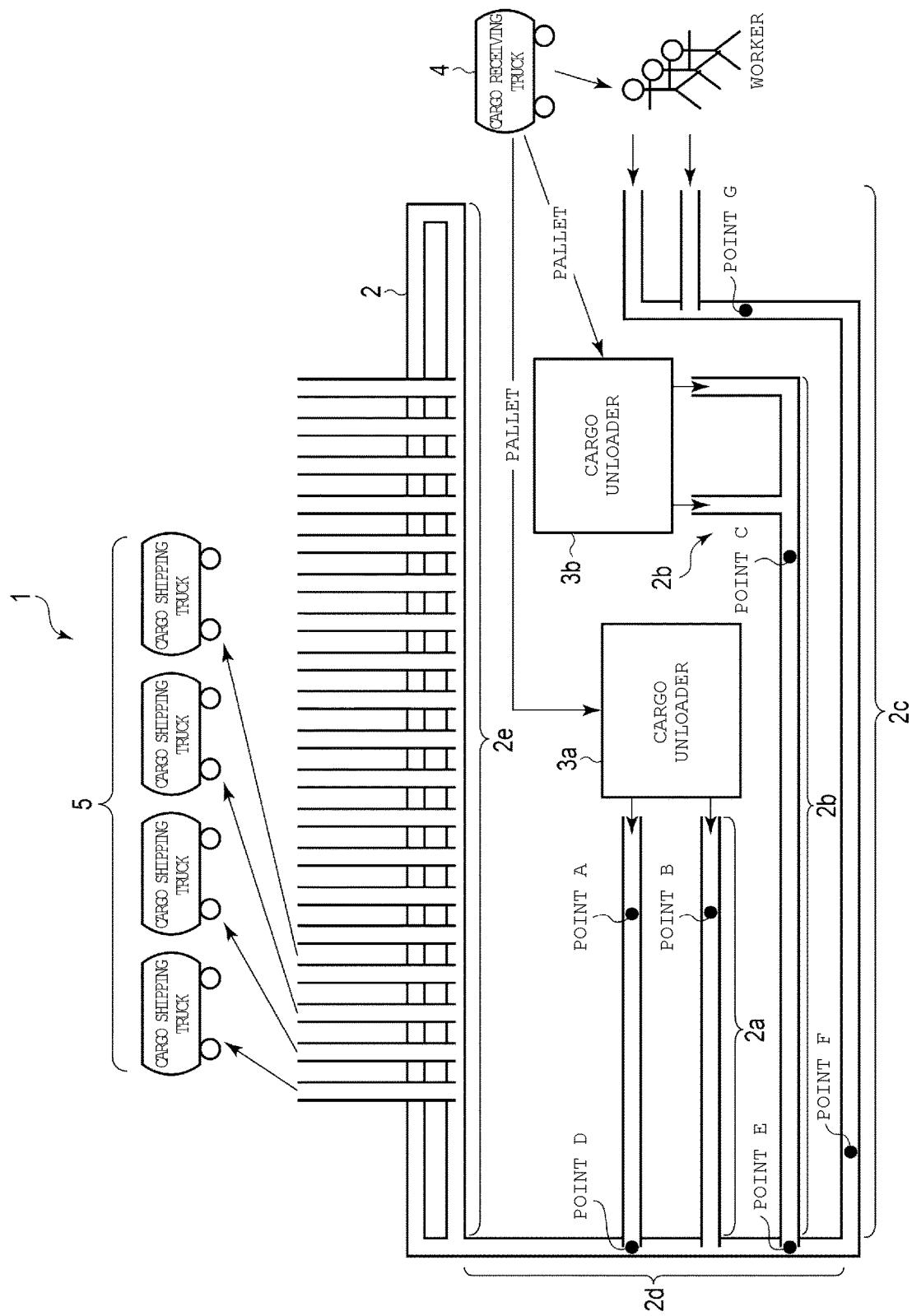
FIG. 1 is a diagram conceptually showing a configuration example of a package handling system according to an embodiment.

FIG. 1 shows a configuration example of a package handling system 1. As shown in FIG. 1, the package handling system 1 includes a conveyor 2, package unloaders 3 (3a and 3b), a package receiving truck 4, a package shipping truck 5, and the like.

The package receiving truck 4 conveys the pallet loaded with the package to a predetermined position. When the package receiving truck 4 reaches a predetermined position, the worker or the robot unloads the pallet from the package receiving truck 4. The unloaded pallets are conveyed to the package unloader 3a or 3b by the worker or the robot. The worker may unload the package from the pallet and places the package onto the conveyor 2.

The package unloader 3 unloads the package from the pallet under the control of a WES (Warehouse Execution System) 10 which will be described later. The package unloader 3 places the unloaded package onto the conveyor 2. For example, the package unloader 3 is configured with a gripping mechanism that grips a package and an arm that moves the gripping mechanism.

In addition, the package unloader 3 transmits operation information regarding the operation of the package unloader to the WES 10. For example, a processor provided in the package unloader 3 transmits the operation information to the WES 10.

For example, the package unloader 3 transmits the operation information to the WES 10 at predetermined intervals or in accordance with a request from the WES 10.

Here, the operation information indicates a state of the package unloader 3 (normal, unable to input, or the like) and an operation mode. The operation mode indicates a speed at which the package unloader 3 inputs packages onto the conveyor 2 (for example, the number of packages input onto the conveyor 2 per unit time). Here, the operation mode is a high speed mode or a low speed mode. The configuration of the operation information is not limited to a specific configuration.

The package unloader 3 is logistics equipment supplied by a vendor B. The package unloader 3 transmits the operation information to the WES 10 according to a format (e.g., format B1) of the vendor B.

Here, the package handling system 1 includes two package unloaders 3a and 3b. The number of package unloaders 3 provided in the package handling system 1 is not limited to a specific number. The conveyor 2 conveys the package placed thereon by the package unloader 3 or the worker, under the control of the WES 10. The conveyor 2 sorts the packages while conveying the packages. For example, the conveyor 2 sorts the packages by delivery destination based on a business form (slip) or the like attached to the package.

The conveyor 2 is configured with paths 2a to 2e. The path 2a is a path onto which the package unloader 3a places the package.

The path 2b is a path onto which the package unloader 3b places the package.

The path 2c is a path onto which the worker places the package.

The path 2d connects to downstream ends of the paths 2a, 2b, and 2c. The path 2d is a path along which the packages placed onto the paths 2a, 2b, and 2c are collected and conveyed.

The path 2e connects to a downstream end of path 2d. The path 2e is a path for sorting the packages into a plurality of sorting destinations. For example, the path 2e sorts the packages based on the destination of the packages.

For example, each path of the conveyor 2 is configured with an endless belt for conveying the package, a roller for supporting the endless belt from the inside, and a motor for rotating the roller.

The conveyor 2 transmits to the WES 10 traffic congestion information indicating the number of packages passing points A to F per unit time (for example, one hour).

The point A and a point B are on the path 2a. That is, the point A and the point B are points through which the packages placed onto the path 2a by the package unloader 3a pass.

The point C is on the path 2b. That is, the point C is a point through which the packages placed onto the path 2b by the package unloader 3b pass.

The point D is near a confluence of the paths 2a and 2d. The point E is near a confluence of the paths 2b and 2d. The point F and the point G are on the path 2c. That is, the point F and the point G are points through which the packages placed onto the path 2c by the worker pass.

For example, the conveyor 2 includes a processor that controls the conveyor 2 and sensors that detect the passage of the packages at the points A to F. For example, the sensor is a sensor that detects passage of the packages using infrared rays.

The processor counts the packages passing through the points A to F using the sensors. The processor generates the traffic congestion information based on the counted value and transmits it to the WES 10.

For example, the conveyor 2 transmits the traffic congestion information to the WES 10 at a predetermined interval or according to the request from the WES 10.

The conveyor 2 is the logistics equipment supplied by the vendor A which is different from the vendor B. The conveyor 2 transmits the traffic congestion information to the WES 10 according to a format (e.g., format A1) of the vendor A, which is different from the format B1.

The packages sorted by the conveyor 2 are loaded onto the package shipping truck 5 by the worker or the robot. For example, the packages may be loaded onto the package shipping truck 5 after they have been loaded on a pallet or the like. The package shipping truck 5 loads and conveys the package sorted by the conveyor 2. The word "package" may be referred to as cargo, baggage, luggage, freight, load, parcel, or the like.

Figure 2:
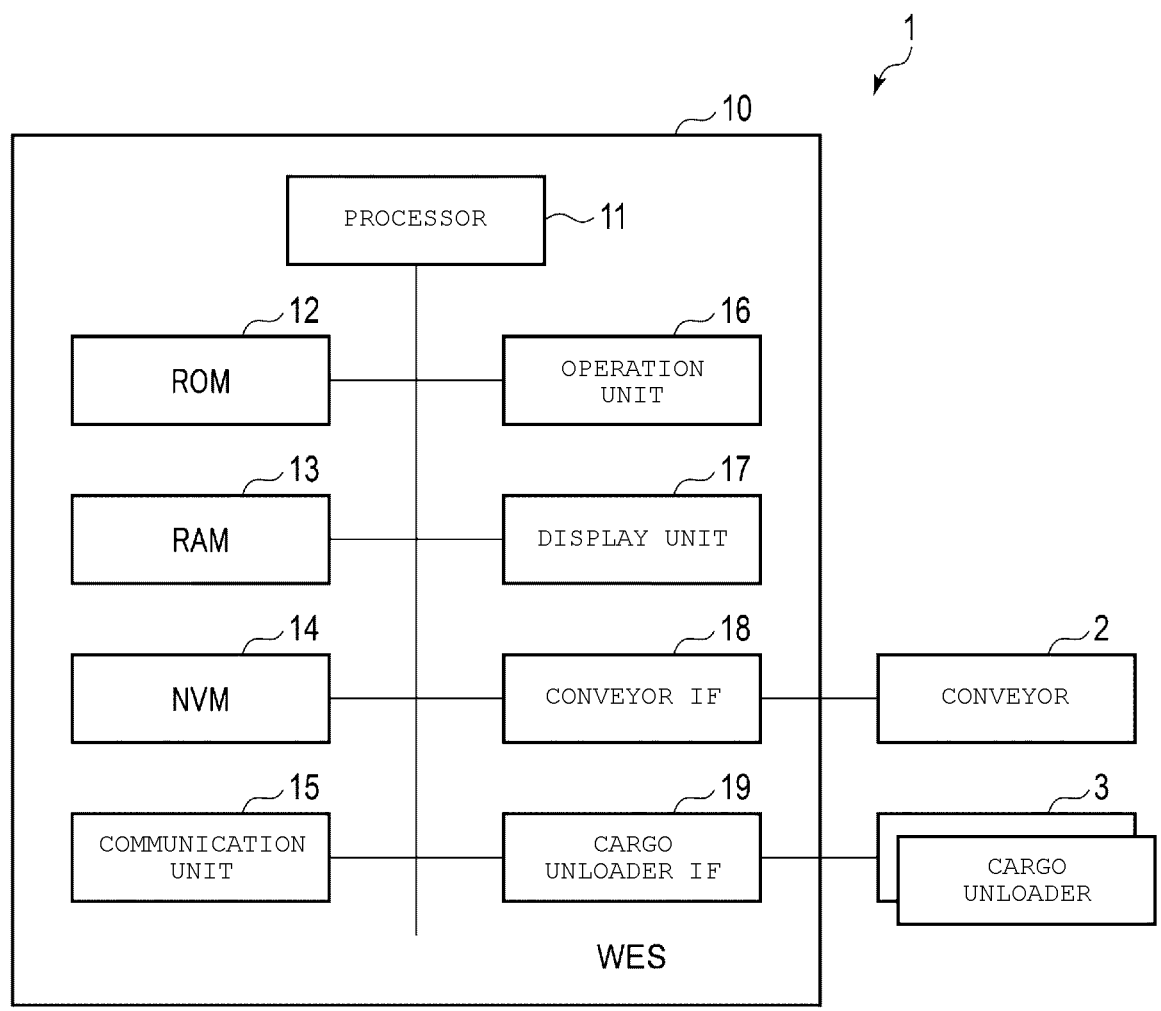
FIG. 2 is a diagram illustrating a configuration example of a control system of the package handling system according to the embodiment.

Next, a control system of the package handling system 1 will be described. FIG. 2 is a block diagram showing a configuration example of the control system of the package handling system 1 according to the embodiment. As shown in FIG. 2, the package handling system 1 includes the conveyor 2, the package unloader 3, the WES 10, and the like.

The warehouse execution system (WES) 10 is an information processing device and is called a warehouse operation management system, and can be implemented by one or a plurality of computers. The WES 10 controls the entire package handling system 1 based on information or the like from the conveyor 2 and the package unloader 3.

As shown in FIG. 2, the WES 10 includes a processor 11, a ROM 12, a RAM 13, a nonvolatile memory (NVM) 14, a communication unit 15, an operation unit 16, a monitor 17, a conveyor interface 18, a package unloader interface 19, and the like.

The processor 11, the ROM 12, the RAM 13, the NVM 14, the communication unit 15, the operation unit 16, the monitor 17, the conveyor interface 18, and the package unloader interface 19 are connected to each other via a data bus or the like. The WES 10 may have a configuration other than the configuration shown in FIG. 2, and may exclude a specific configuration from the WES 10.

The processor 11 has a function of controlling the entire operation of the WES 10. The processor 11 may include an internal cache, various interfaces, and the like. The processor 11 implements various processes by executing programs stored in advance in the internal memory, the ROM 12 or the NVM 14.

Some of the various functions implemented by the processor 11 executing the program may be implemented by a hardware circuit. In this case, the processor 11 controls the function performed by the hardware circuits.

The ROM 12 is a non-volatile memory in which control programs, control data, and the like are stored in advance. The control program and the control data stored in the ROM 12 are installed in advance according to the specifications of the WES 10.

The RAM 13 is a volatile memory. The RAM 13 temporarily stores data or the like being processed by the processor 11. The RAM 13 stores various application programs based on the instructions from the processor 11. In addition, the RAM 13 may store data necessary for executing the application program, an execution result of the application program, and the like.

The NVM 14 is a non-volatile memory in which data can be written and rewritten. For example, the NVM 14 is configured with a Hard Disk Drive (HDD), a Solid State Drive (SSD), a flash memory, or the like. The NVM 14 stores a control program, an application, various data, and the like according to the operational use of the WES 10.

The communication unit 15 is an interface for communicating data with another device such as a host device. For example, the communication unit 15 supports wired or wireless Local Area Network (LAN) connection.

The operation unit 16 receives inputs of various operations from the operator. The operation unit 16 transmits a signal indicating the input operation to the processor 11. For example, the operation unit 16 is configured with a mouse, a keyboard, a touch panel, or the like.

The monitor 17 displays image data from the processor 11. For example, the monitor 17 is configured with a liquid crystal display. In addition, when the operation unit 16 is configured with the touch panel, the monitor 17 may be formed integrally with the touch panel as the operation unit 16.

The conveyor interface 18 is an interface for communicating data with the conveyor 2. The conveyor interface 18 connects to the conveyor 2 via a network or the like. For example, the conveyor interface 18 supports a wired or wireless LAN connection.

The package unloader interface 19 is an interface for communicating data with the package unloader 3. The package unloader interface 19 connects to the package unloader 3 via a network or the like. For example, the package unloader interface 19 supports a wired or wireless LAN connection.

The communication unit 15, the conveyor interface 18, and the package unloader interface 19 (or part of them) may be integrally configured.

Next, a function implemented by the WES 10 will be described. The function implemented by the WES 10 is implemented by the processor 11 executing a program stored in the ROM 12, the NVM 14, or the like.

First, the processor 11 has a function of acquiring the traffic congestion information from the conveyor 2 via the conveyor interface 18.

For example, the processor 11 transmits a request for the traffic congestion information to the conveyor 2 via the conveyor interface 18 at a predetermined timing. The processor 11 acquires the traffic congestion information from the conveyor 2 as a response to the request.

The processor 11 may acquire the traffic congestion information from the conveyor 2 by push notification.

The processor 11 may acquire the traffic congestion information from the conveyor 2 by a queuing function.

When acquiring the traffic congestion information, the processor 11 converts the format of the traffic congestion information to a predetermined format (e.g., a common format). That is, the processor 11 converts the traffic congestion information from the format A1 to the common format.

The processor 11 may assign an ID for identifying the logistics equipment to the conveyor 2. For example, the processor 11 may assign the ID of the conveyor 2 to the traffic congestion information from the conveyor 2 and manage the information.

In addition, the processor 11 has a function of acquiring the operation information from the package unloader 3 via the package unloader interface 19.

For example, the processor 11 transmits a request for the operation information to the package unloader 3 via the package unloader interface 19 at a predetermined timing.

The processor 11 acquires the operation information from the package unloader 3 as a response to the request.

The processor 11 may acquire the operation information from the package unloader 3 by push notification.

The processor 11 may acquire the operation information from the package unloader 3 by a queuing function.

When acquiring the operation information, processor 11 converts the format of the operation information to the common format. That is, the processor 11 converts the operation information from the format B1 to the common format.

The processor 11 may assign an ID for identifying the logistics equipment to each of the package unloaders 3a and 3b. For example, the processor 11 may assign the ID of the package unloader 3a or 3b to the operation information from the package unloader 3a or 3b and manage the information.

Figure 6A:
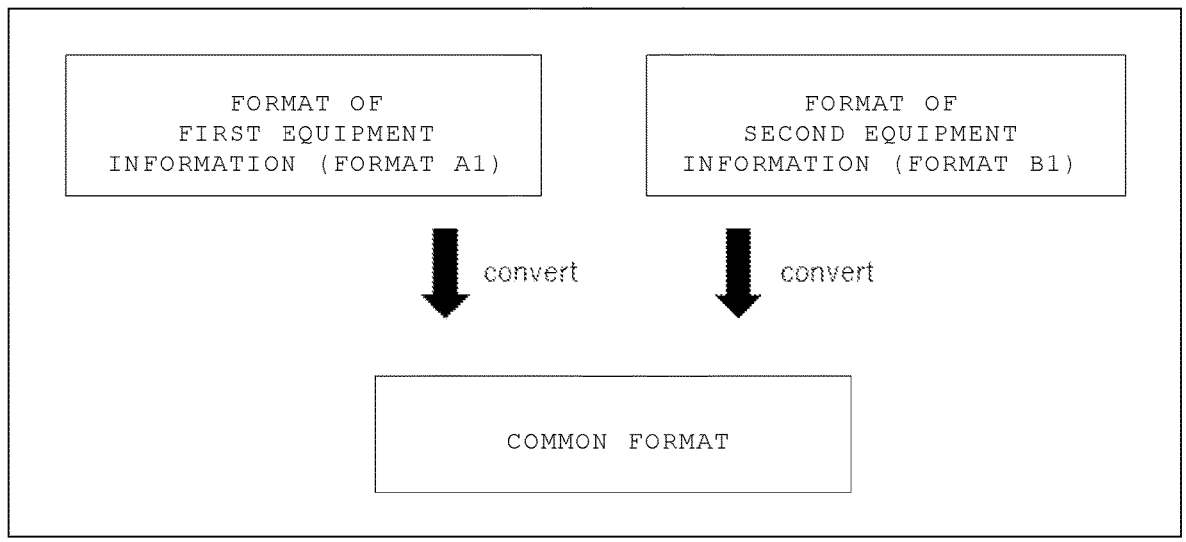
FIG. 6A is a conceptual diagram showing formats according to the embodiment.
Figure 6B:
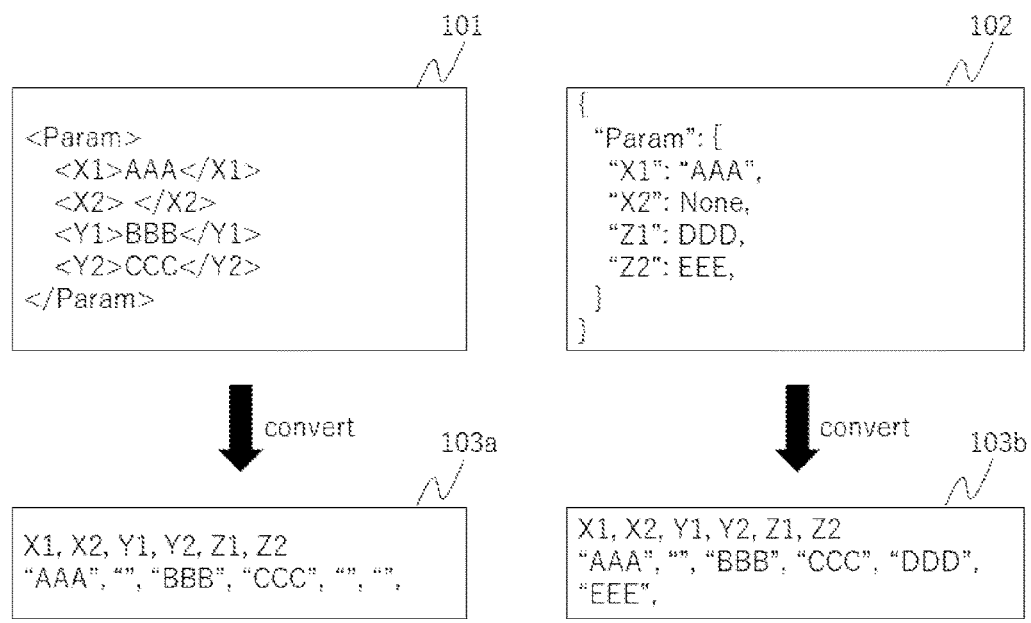
FIG. 6B is a diagram showing an example of a common format according to the embodiment.

In addition, the processor 11 has a function of displaying the traffic congestion information and the operation information on the monitor 17. FIG. 6A is a conceptual diagram showing a relationship between the format of the first equipment information (format A1), the format of the second equipment information (format B1), and the common format. An example of the common format will be explained using FIG. 6B. Data 101 is operation information that the processor 11 acquires from the package unloader 3. The data 101 is written in the format B1 (for example, an XML format). The processor 11 converts data 101, which is the acquired operation information, from the format B1 into the common format (for example, a CSV format). The data 102 is the traffic congestion information that the processor 11 acquires from the conveyor 2. The data 102 is written in the format A1 (for example, a JSON format). The processor 11 converts the data 102, which is the acquired traffic congestion information, from the format A1 into the common format (for example, a CSV format). The data 103a is the traffic congestion information obtained by converting the data 101 into the common format by the processor 11. The data 103b is the operation information obtained by converting the data 101 into the common format by the processor 11. When the processor 11 converts the operation information or the traffic congestion information into the common format, the missing data may be returned as a blank, or may be compensated based on the stored information.

Figure 3:
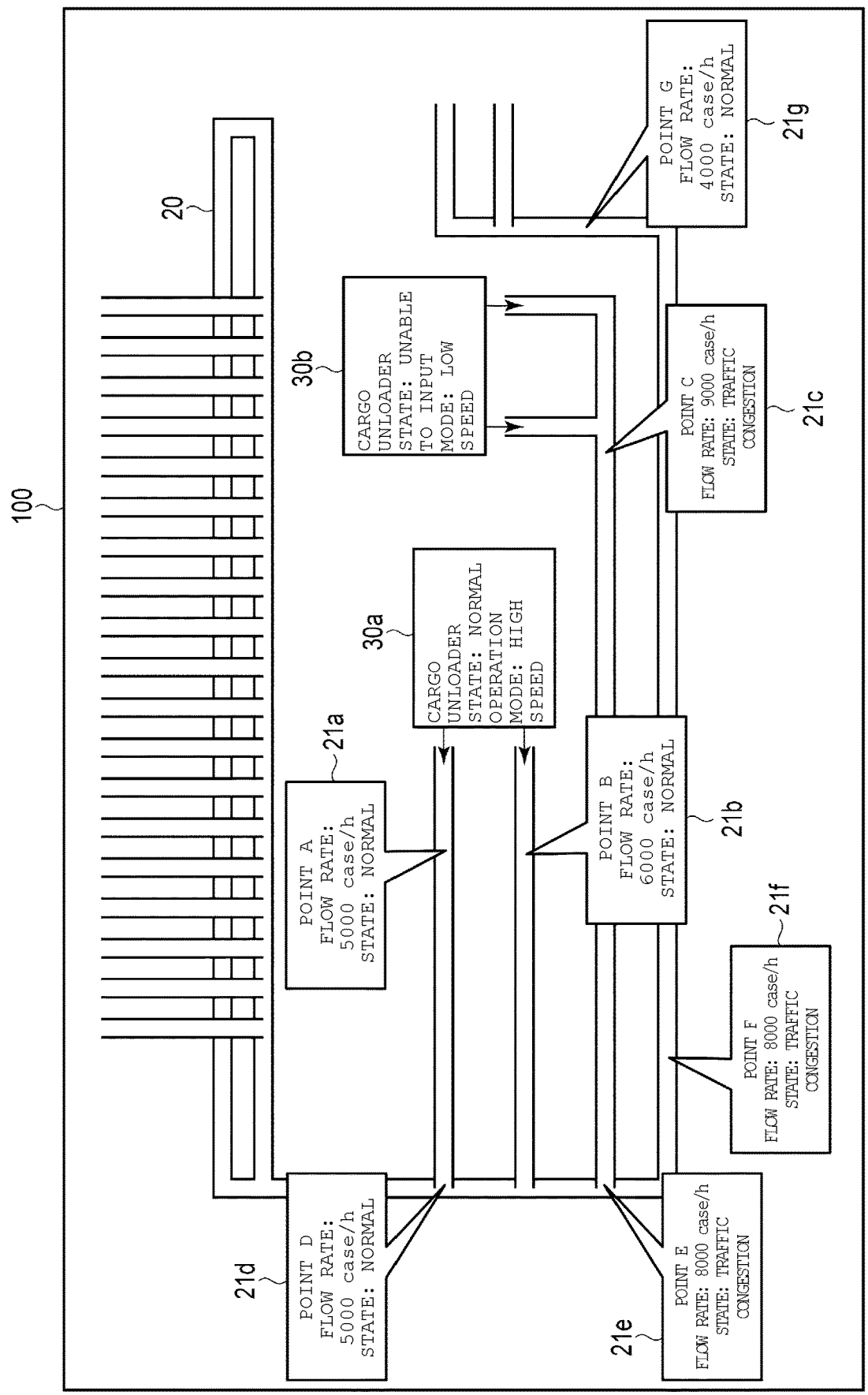
FIG. 3 is a diagram illustrating a display example of a warehouse execution system (WES) according to the embodiment.

FIG. 3 shows an example of a display screen 100 on which the processor 11 displays the traffic congestion information and the operation information. The processor 11 displays the display screen 100 on the monitor 17.

As shown in FIG. 3, the display screen 100 displays a schematic diagram 20, icons 21a to 21g, a schematic diagram 30, and the like.

The schematic diagram 20 is a schematic diagram of the conveyor 2. The schematic diagram 20 shows a rough appearance of the conveyor 2.

The icons 21a to 21g display the traffic congestion information. The icons 21a to 21g are displayed at positions corresponding to the points A to G. The icons 21a to 21g respectively display flow rates at the points A to G.

In addition, the icons 21a to 21g indicate states at the points A to G. Here, the processor 11 determines that the state is "traffic congestion" (indicating that traffic congestion occurs) when the flow rate is equal to or greater than a predetermined threshold value (for example, 7000 cases/h). In addition, the processor 11 determines that the state is "normal" (indicating that there is no traffic congestion) when the flow rate is less than the predetermined threshold value.

The icons 21a to 21g may be displayed in changed colors of characters when the state is "traffic congestion".

The schematic diagram 30 is a schematic diagram of the package unloader 3. The schematic diagram 30 is displayed at a position corresponding to the package unloader 3.

The schematic diagram 30 displays the operation information of the package unloader 3. As shown in FIG. 3, the schematic diagram 30 internally displays the state and the operation mode of the package unloader 3. In addition, in the schematic diagram 30, when the state is "unable to input", the character color may be changed and displayed.

The configuration example of the display screen 100 is not limited to a specific configuration.

The processor 11 updates the display screen 100 when newly acquiring the traffic congestion information or the operation information.

In addition, the processor 11 has a function of controlling the conveyance speed of the conveyor 2 based on the traffic congestion information.

As described above, the processor 11 acquires the traffic congestion information from the conveyor 2. When acquiring the traffic congestion information, the processor 11 determines whether the traffic congestion occurs at the point D or the point E. That is, the processor 11 determines whether the state at the point D or the point E is the "traffic congestion".

When determining that the traffic congestion occurs at the point D or the point E, the processor 11 generates a result of a simulation when the conveyance speed of the path 2d is adjusted. Here, the processor 11 generates a result of a simulation in which the conveyance speed of the path 2d is reduced to a predetermined speed in order to reduce the flow rate to the path 2e.

The simulation shows a prediction of the flow rate at the points A to G when the conveyance speed of the path 2d is reduced. The processor 11 generates the result of the simulation according to a predetermined algorithm.

When generating the result of the simulation, the processor 11 displays the result of the simulation on the monitor 17.

When displaying the result of the simulation, the processor 11 waits until a confirmation operation is input via the operation unit 16 to instruct adjustment of the conveyance speed of the path 2e.

Here, it is assumed that the operator confirms the result of the simulation and inputs the confirmation operation to the operation unit 16.

When inputting the confirmation operation, the processor 11 generates a control signal to reduce the conveyance speed of the path 2e. When generating the control signal, the processor 11 changes the format of the control signal to the format A1. When changing the format of the control signal, the processor 11 transmits the changed format control signal to the conveyor 2 via the conveyor interface 18.

When transmitting the control signal, the processor 11 determines whether the traffic congestion at the point D or the point E has cleared. That is, the processor 11 determines whether the state at the point D or the point E is "normal".

When determining that the traffic congestion has been cleared at the point D or the point E, the processor 11 generates a simulation when the conveyance speed of the path 2d is increased (e.g., to return to the original conveyance speed).

The simulation shows the prediction of the flow rate at the points A to G when the conveyance speed of path 2d is increased. The processor 11 generates the simulation according to a predetermined algorithm.

When generating the simulation, the processor 11 displays the simulation on the monitor 17.

When displaying the simulation, the processor 11 waits until the confirmation operation is input via the operation unit 16.

Here, it is assumed that the operator confirms the simulation and inputs the confirmation operation to the operation unit 16.

When inputting the confirmation operation, the processor 11 generates a control signal for increasing the conveyance speed of the path 2e. When generating the control signal, the processor 11 changes the format of the control signal to the format A1. When changing the format of the control signal, the processor 11 transmits the changed format control signal to the conveyor 2 via the conveyor interface 18.

In addition, the processor 11 has a function of controlling the operation mode of the package unloader 3 based on the traffic congestion information.

Here, an operation example in which the processor 11 controls the operation mode of the package unloader 3a will be described. In addition, it is assumed that the package unloader 3a operates in the high speed mode.

As described above, the processor 11 acquires the traffic congestion information from the conveyor 2. When acquiring the traffic congestion information, the processor 11 determines whether the traffic congestion occurs at the point A or the point B. That is, the processor 11 determines whether the state at the point A or the point B is in the "traffic congestion".

When determining that the traffic congestion occurs at the point A or the point B, the processor 11 generates a simulation when the operation mode of the package unloader 3a is set to the low speed mode.

The simulation shows the prediction of the flow rate at the points A to G when the operation mode of the package unloader 3a is set to the low speed mode. The processor 11 generates the simulation according to a predetermined algorithm.

When generating the simulation, the processor 11 displays the simulation on the monitor 17.

When displaying the simulation, the processor 11 waits until a confirmation operation is input via the operation unit 16 to set the operation mode of the package unloader 3a to the low speed mode.

Here, it is assumed that the operator confirms the simulation and inputs the confirmation operation to the operation unit 16.

When inputting the confirmation operation, the processor 11 generates a control signal for setting the operation mode of the package unloader 3a to the low speed mode. When generating the control signal, the processor 11 changes the format of the control signal to the format B1. When changing the format of the control signal, the processor 11 transmits the changed format control signal to the package unloader 3 via the package unloader interface 19.

When transmitting the control signal, the processor 11 determines whether the traffic congestion at the point A or the point B has cleared. That is, the processor 11 determines whether the state at the point A or the point B is "normal".

When determining that the traffic congestion has been cleared at the point A or the point B, the processor 11 generates a simulation when the operation mode of the package unloader 3a is set to the high speed mode.

The simulation shows predictions of the flow rates at the points A to G when the operation mode of the package unloader 3a is set to the high speed mode. The processor 11 generates the simulation according to a predetermined algorithm.

When generating the simulation, the processor 11 displays the simulation on the monitor 17.

When displaying the simulation, the processor 11 waits until the confirmation operation is input via the operation unit 16.

Here, it is assumed that the operator confirms the simulation and inputs the confirmation operation to the operation unit 16.

When inputting the confirmation operation, the processor 11 generates a control signal for setting the operation mode of the package unloader 3a to the high speed mode. When generating the control signal, the processor 11 changes the format of the control signal to the format B1. When changing the format of the control signal, the processor 11 transmits the changed format control signal to the package unloader 3a via the package unloader interface 19.

The processor 11 similarly controls the operation mode of the package unloader 3b based on the flow rate at the point C.

Figure 4:
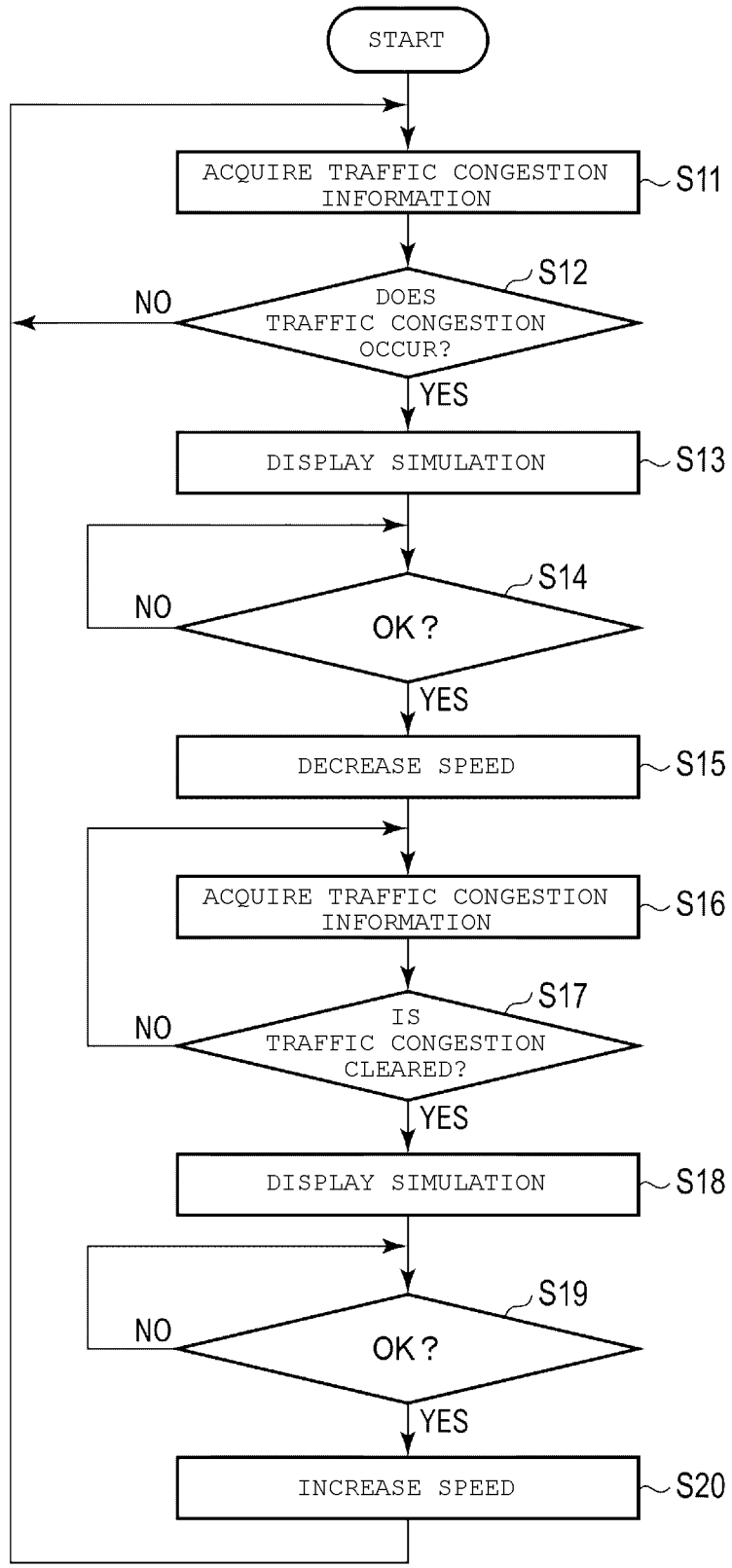
FIG. 4 is a sequence diagram illustrating an operation example of the WES according to the embodiment.

Next, an operation example of the WES 10 will be described. First, an operation example in which the WES 10 controls the conveyance speed of the conveyor 2 will be described. FIG. 4 is a flow chart illustrating the operation example in which the WES 10 controls the conveyance speed of the conveyor 2.

First, the processor 11 of the WES 10 acquires the traffic congestion information from the conveyor 2 via the conveyor interface 18 (S11). When acquiring the traffic congestion information, the processor 11 determines whether the traffic congestion occurs at the point D or the point E (S12).

When determining that the traffic congestion occurs at the point D or the point E (S12, YES), the processor 11 displays a simulation on the monitor 17 when the conveyance speed of the path 2d is reduced (S13).

When displaying the simulation, the processor 11 determines whether the confirmation operation has been input via the operation unit 16 (S14). When determining that the confirmation operation has not been input (S14, NO), the processor 11 returns to S14.

When determining that the confirmation operation has been input (S14, YES), the processor 11 transmits the control signal to reduce the conveyance speed of the path 2d to the conveyor 2 via the conveyor interface 18 (S15).

When transmitting the control signal to the conveyor 2, the processor 11 acquires the traffic congestion information from the conveyor 2 via the conveyor interface 18 (S16). When acquiring the traffic congestion information, the processor 11 determines whether the traffic congestion is cleared at the point D or the point E (S17).

When determining that the traffic congestion has been cleared at the point D or the point E (S17, YES), the processor 11 displays a simulation on the monitor 17 when the conveyance speed of the path 2d is increased (S18).

When displaying the simulation, the processor 11 determines whether the confirmation operation has been input via the operation unit 16 (S19). When determining that the confirmation operation has not been input (S19, NO), the processor 11 returns to S19.

When determining that the confirmation operation has been input (S19, YES), the processor 11 transmits the control signal for increasing the conveyance speed of the path 2d to the conveyor 2 via the conveyor interface 18 (S20).

When determining that the traffic congestion does not occur at the point D or the point E (S12, NO), or when transmitting the control signal for increasing the conveyance speed of path 2d to conveyor 2 (S20), the processor 11 returns to S11.

Next, an operation example in which the WES 10 controls the operation mode of the package unloader 3a will be described. FIG. 5 is a flow chart illustrating an operation example in which the WES 10 controls the operation mode of the package unloader 3a. Here, it is assumed that the package unloader 3a operates in the high speed mode.

First, the processor 11 of the WES 10 acquires the traffic congestion information from the conveyor 2 via the conveyor interface 18 (S21). When acquiring the traffic congestion information, the processor 11 determines whether the traffic congestion occurs at the point A or the point B (S22).

When determining that the traffic congestion occurs at the point A or the point B (S22, YES), the processor 11 displays the simulation on the monitor 17 when the operation mode of the package unloader 3a is set to the low speed mode (S23).

When displaying the simulation, the processor 11 determines whether the confirmation operation has been input via the operation unit 16 (S24). When determining that the confirmation operation has not been input (S24, NO), the processor 11 returns to S24.

When determining that the confirmation operation has been input (S24, YES), the processor 11 transmits the control signal for setting the operation mode of the package unloader 3a to the low speed mode to the package unloader 3a via the package unloader interface 19 (S25).

When transmitting the control signal to the package unloader 3a, the processor 11 acquires the traffic congestion information from the conveyor 2 via the conveyor interface 18 (S26). When acquiring the traffic congestion information, the processor 11 determines whether the traffic congestion is cleared at the point A or the point B (S27).

When determining that the traffic congestion is cleared at the point A or the point B (S27, YES), the processor 11 displays the simulation on the monitor 17 when the operation mode of the package unloader 3a is set to the high speed mode (S28).

When displaying the simulation, the processor 11 determines whether the confirmation operation has been input via the operation unit 16 (S29). When determining that the confirmation operation has not been input (S29, NO), the processor 11 returns to S29.

When determining that the confirmation operation has been input (S29, YES), the processor 11 transmits the control signal for setting the operation mode of the package unloader 3a to the high speed mode to the package unloader 3a via the package unloader interface 19 (S30).

When determining that the traffic congestion does not occur at the point A or the point B (S22, NO), or when transmitting the control signal for setting the operation mode of the package unloader 3a to the high speed mode is to the package unloader 3a (S30), the processor 11 returns to S21.

The processor 11 may similarly determine whether the traffic congestion occurs at the point C and control the operation mode of the package unloader 3b.

The processor 11 may execute S11 to S20 and S21 to S30 concurrently in parallel.

The processor 11 may display the display screen 100 concurrently in parallel with S11 to S20 and S21 to S30. In this case, the processor 11 may update the display screen 100 by acquiring the traffic congestion information and the operation information at a predetermined timing.

The processor 11 may display a warning on the monitor 17 when determining that the traffic congestion occurs at the point F or the point G. For example, the processor 11 displays the warning overlaid on the display screen 100. In addition, the processor 11 may display a warning on the monitor 17 instructing the worker to reduce the speed at which the packages are placed onto the path 2c.

The processor 11 may set the operation mode of the package unloader 3a to the low speed mode when determining that the traffic congestion occurs at the point D. In addition, the processor 11 may set the operation mode of the package unloader 3b to the low speed mode when determining that the traffic congestion occurs at the point E.

The processor 11 may increase the conveyance speed of the path 2a when determining that the traffic congestion occurs at the point A or the point B.

The processor 11 may increase the conveyance speed of the path 2b when determining that the traffic congestion occurs at the point C.

The processor 11 may increase the conveyance speed of the path 2d when determining that the traffic congestion occurs at the point D or the point E.

The processor 11 may increase the conveyance speed of the path 2c when determining that the traffic congestion occurs at the point F or the point G.

The method by which the processor 11 controls the conveyor 2 and the package unloader 3 is not limited to any specific method.

In addition, the processor 11 may not display the simulation in some cases. In such cases, the processor 11 may control the conveyor 2 or the package unloader 3 without waiting for the confirmation operation from the operator to be input.

In addition, the package handling system may include logistics equipment supplied by three or more different vendors.

The package handling system configured as described above integrates and displays the equipment information from the logistics equipment supplied by different vendors. As a result, the package handling system can effectively present the state of each logistics equipment to the operator.

In addition, the package handling system controls the logistics equipment supplied by other vendors based on the logistics information from the logistics equipment supplied by one vendor. As a result, the package handling system can effectively control the logistics equipment supplied by different vendors.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An information processing device for controlling a package handling system, comprising:
    a first interface connected to a first logistics equipment supplied by a first vendor;
    a second interface, different from the first interface, connected to a second logistics equipment supplied by a second vendor different from the first vendor; and
    a processor configured to:
        acquire flow rate data output by sensors of the first logistics equipment via the first interface,
        change a format of the acquired flow rate data from a first format to a common format,
        acquire equipment information regarding the second logistics equipment via the second interface,
        change a format of the equipment information from a second format to the common format,
        generate a display screen for display on a monitor, using the flow rate data in the common format and the equipment information in the common format, the display screen showing flow rates at different points of the first logistics equipment, the equipment information, and a congestion state of the package handling system,
        update the display screen after performing a simulation of the package handling system with a change in at least one operating characteristic of one of the first logistics equipment and the second logistics equipment, the updated display screen showing flow rates at different points of the first logistics equipment, the equipment information, and a congestion state of the simulated package handling system, and
        issue a control signal that is in one of the first and second formats to apply the change in the at least one operating characteristic.

2. The information processing device according to claim 1, wherein
    the first logistics equipment is a conveyor for conveying packages, and
    the sensors are installed at different points of the conveyor.

3. The information processing device according to claim 2, wherein the display screen includes a schematic diagram of the conveyor and the flow rates at the different points of the conveyor.

4. The information processing device according to claim 2, wherein the conveyor includes a plurality of sections and the control signal is issued in the first format through the first interface to control a conveyance speed of at least one of the sections.

5. The information processing device according to claim 4, wherein the control signal is issued to reduce the conveyance speed of at least one of the sections when there is traffic congestion at any one of the points of the conveyor.

6. The information processing device according to claim 5, wherein the control signal is issued to increase the conveyance speed of the at least one of the sections when the traffic congestion is cleared.

7. The information processing device according to claim 2, wherein
    the second logistics equipment is a package unloader that places packages onto the conveyor, and
    the equipment information indicates an operation mode regarding a speed at which the package unloader places the package onto the conveyor.

8. The information processing device according to claim 7, wherein
    the control signal is issued in the second format through the second interface to change the operation mode of the package unloader.

9. The information processing device according to claim 8, wherein the control signal is issued to change the operation mode of the package unloader to a low speed mode when there is traffic congestion at any one of the points of the first logistics equipment.

10. The information processing device according to claim 9, wherein the control signal is issued to change the operation mode of the package unloader to a high speed mode when the traffic congestion is cleared.

11. The information processing device according to claim 1, further comprising:
an operation mechanism configured to receive an operation input,
wherein the processor issues the control signal when an input of a predetermined operation is received via the operation mechanism while the updated display screen is displayed on the monitor.

12. The information processing device according to claim 1, wherein the display screen includes a warning when there is traffic congestion at any one of the points of the first logistics equipment.

13. An information processing method for controlling a package handling system executed by a processor, comprising:
acquiring flow rate data output by sensors of a first equipment supplied by a first vendor;
changing a format of the flow rate data from a first format to a common format;
acquiring equipment information regarding a second logistics equipment supplied by a second vendor different from the first vendor;
changing a format of the equipment information from a second format to the common format;
generating a display screen for display on a monitor, using the flow rate data in the common format and the equipment information in the common format, the display screen showing flow rates at different points of the first logistics equipment, the equipment information, and a congestion state of the package handling system;
updating the display screen after performing a simulation of the package handling system with a change in at least one operating characteristic of one of the first logistics equipment and the second logistics equipment, the updated display screen showing flow rates at different points of the first logistics equipment, the equipment information, and a congestion state of the simulated package handling system; and
issuing a control signal that is in one of the first and second formats to apply the change in the at least one operating characteristic.

14. The information processing method according to claim 13, wherein
the first logistics equipment is a conveyor for conveying packages, and
the sensors are installed at different points of the conveyor.

15. The information processing method according to claim 14, wherein the conveyor includes a plurality of sections and the control signal is issued in the first format through the first interface to control a conveyance speed of at least one of the sections.

16. The information processing method according to claim 14, wherein
the second logistics equipment is a package unloader that places packages onto the conveyor, and
the equipment information indicates an operation mode regarding a speed at which the package unloader places the package onto the conveyor.

17. The information processing method according to claim 16, wherein
the control signal is issued in the second format through the second interface to change the operation mode of the package unloader.

18. A package handling system comprising:
a first logistics equipment, a second logistics equipment, and an information processing device, wherein
the first logistics equipment is supplied by a first vendor, and the second logistics equipment is supplied by a second vendor different from the first vendor, and
the information processing device includes:
a first interface connected to the first logistics equipment,
a second interface, different from the first interface, connected to the second logistics equipment,
a monitor for displaying information, and
a processor configured to: acquire flow rate data output by sensors of the first logistics equipment via the first interface,
change a format of the acquired flow rate data from a first format to a common format,
acquire equipment information regarding the second logistics equipment via the second interface,
change a format of the equipment information from a second format to the common format,
generate a display screen for display on the monitor, using the flow rate data in the common format and the equipment information in the common format, the display screen showing flow rates at different points of the first logistics equipment, the equipment information, and a congestion state of the package handling system,
update the display screen after performing a simulation of the package handling system with a change in at least one operating characteristic of one of the first logistics equipment and the second logistics equipment, the updated display screen showing flow rates at different points of the first logistics equipment, the equipment information, and a congestion state of the simulated package handling system, and
issue a control signal that is in one of the first and second formats to apply the change in the at least one operating characteristic.

19. The package handling system according to claim 18, wherein
the first logistics equipment is a conveyor for conveying packages, and
the sensors are installed at different points of the conveyor.

20. The package handling system according to claim 19, wherein
the second logistics equipment is a package unloader that places packages onto the conveyor.

* * * * *